(12) United States Patent
Inagaki

(10) Patent No.: US 6,822,671 B2
(45) Date of Patent: Nov. 23, 2004

(54) LIGHT SCANNING APPARATUS HAVING STABLE PERFORMANCE WITH CHANGES IN TEMPERATURE AND WAVELENGTH

(75) Inventor: Yoshihiro Inagaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 214 days.

(21) Appl. No.: 10/097,271

(22) Filed: Mar. 15, 2002

(65) Prior Publication Data

US 2003/0071203 A1 Apr. 17, 2003

(30) Foreign Application Priority Data

Mar. 26, 2001 (JP) ........................................ 2001-086838

(51) Int. Cl.[7] .............................................. B41J 27/00
(52) U.S. Cl. ...................................... 347/258; 347/244
(58) Field of Search ................................ 347/241, 243, 347/244, 256, 258, 259, 248; 359/563, 598, 833, 837, 742

(56) References Cited

U.S. PATENT DOCUMENTS

| | | | |
|---|---|---|---|
| 5,264,869 A | * 11/1993 | Appel et al. | 347/248 |
| 5,748,356 A | 5/1998 | Park et al. | 359/205 |
| 6,067,106 A | 5/2000 | Ishibe et al. | 347/258 |
| 6,101,020 A | 8/2000 | Ori | 359/207 |
| 6,282,034 B1 | * 8/2001 | Onishi et al. | 359/742 |

FOREIGN PATENT DOCUMENTS

| | | |
|---|---|---|
| JP | 5-27195 | 2/1993 |
| JP | 11-305154 | 11/1999 |

* cited by examiner

Primary Examiner—Hai Pham
(74) Attorney, Agent, or Firm—Burns, Doane, Swecker & Mathis, L.L.P.

(57) ABSTRACT

A laser beam emitted from a laser light source is shaped into a substantially parallel beam in the main scanning direction, and is condensed in the vicinity of a deflecting surface of a deflector in the sub scanning direction by a light source optical system. The laser beam deflected by the deflector is projected onto a photosensitive body of an image forming apparatus by a scanning optical system. The light source optical system is constituted by one optical element made of resin. The optical element has a reflecting surface having no symmetry axis of rotation, and two transmitting surfaces. The laser beam incident on the incident side transmitting surface is reflected at the reflecting surface, and exits from the exit side transmitting surface. As described above, by providing the reflecting surface with a beam shaping function, the performance change caused when there is a temperature change can be reduced more than when a refracting surface is provided with the beam shaping function. The transmitting surfaces may be provided with a diffracting function.

18 Claims, 14 Drawing Sheets

LIGHT SCANNING APPARATUS HAVING STABLE PERFORMANCE WITH CHANGES IN TEMPERATURE AND WAVELENGTH

The present application claims priority to Japanese Patent Application No. 2001-86838 filed Mar. 26, 2001, the entire content of which is hereby incorporated by reference.

BACKGROUND OF THE INVENTION

1. Field of the Invention

The present invention relates to a light scanning apparatus, for example, to a laser scanner constituting a print head of an image forming apparatus such as a laser printer or a digital copier.

2. Description of the Related Art

In the field of laser scanners, conventionally, a technology has been proposed to suppress an optical performance change due to a refractive index change or a configuration change caused by a temperature change, and a performance change due to a mode hop (that is, an oscillation wavelength change) of the laser diode by using a diffracting element as the light source optical system (for example, U.S. Pat. Nos. 6,067,106 and 6,101,020).

It is desirable that the light source optical system used for a laser scanner be made of resin for weight and size reduction. However, in the conventional laser scanners, when the light source optical system is made of resin, the condition for compensating for the performance change due to a temperature change and the condition for compensating for the performance change due to an oscillation wavelength change (that is, axial chromatic aberration) significantly differ from each other, so that performance cannot be maintained.

SUMMARY OF THE INVENTION

A principal object of the present invention is to provide a laser scanner being inexpensive and whose performance is stable even when there is a temperature change.

This and other objects are achieved by a laser scanner comprising a laser light source emitting a laser beam; a deflector deflecting an incident laser beam in a main scanning direction; a light source optical system constituted by one optical element made of resin and having: a first transmitting surface on which the laser beam emitted from the laser light source is incident; at least one reflecting surface reflecting the laser beam incident on the first transmitting surface, and having no symmetry axis of rotation; and a second transmitting surface from which the laser beam reflected by the reflecting surface exits, said light source optical system shaping the laser beam emitted from the laser light source into a substantially parallel beam in the main scanning direction, and condensing the laser beam in a vicinity of a deflecting surface of the deflector in a sub scanning direction; and a scanning optical system again condensing the laser beam deflected by the deflector.

The invention itself, together with further objects and attendant advantages, will best be understood by reference to the following detailed description taken in conjunction with the accompanying drawings.

DETAILED DESCRIPTION OF THE PREFERRED EMBODIMENTS

Hereinafter, a laser scanner embodying the present invention will be described with reference to the drawings. The same and corresponding parts of the embodiments are designated by the same reference numbers, and overlapping descriptions are omitted.

Figure 1:
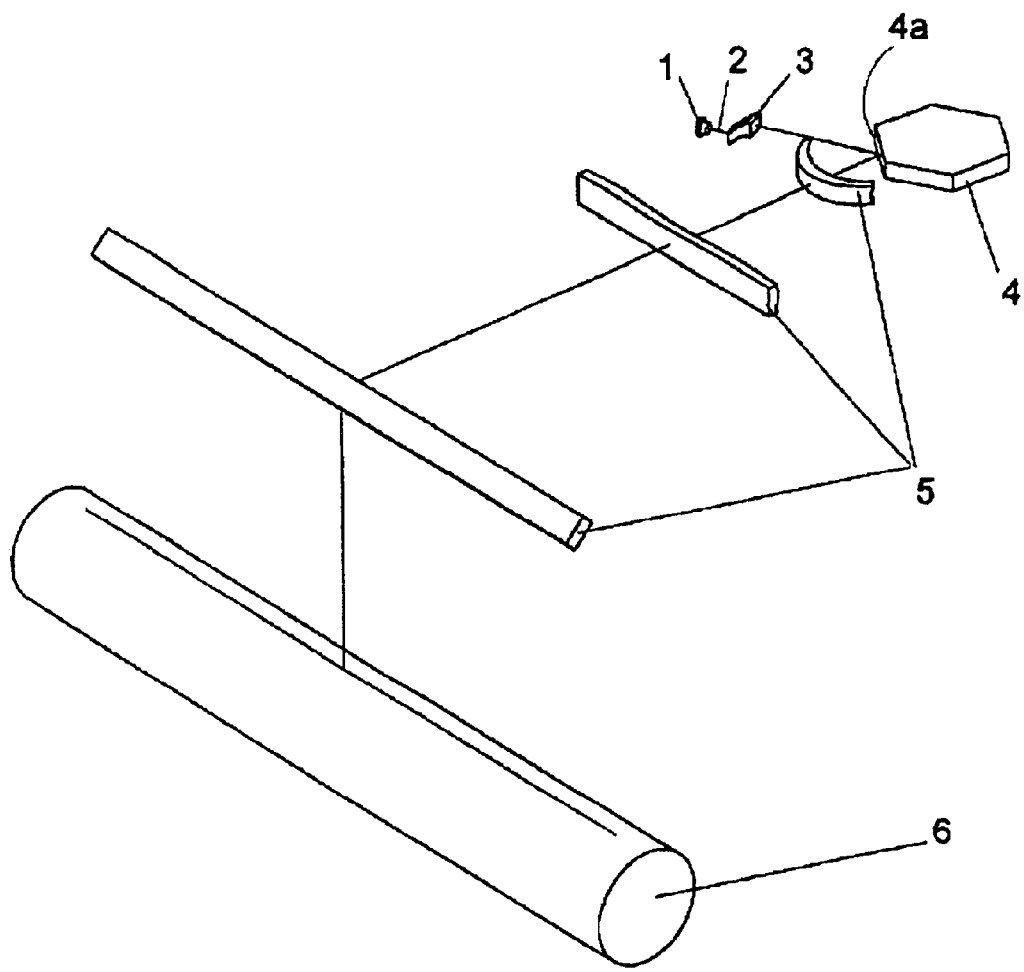
FIG. 1 is a perspective view showing a laser scanner according to the present invention.

FIG. 1 shows a schematic structure of the laser scanner embodying the present invention. This laser scanner performs exposure scanning on a photosensitive body 6 with a laser beam 2 in an image forming apparatus such as a laser printer or a digital copier. The laser scanner includes a laser light source 1, an optical element 3, a polygonal mirror 4 and a scanning optical system 5. First, the laser beam 2 emitted from the laser light source 1 is incident on the optical element 3. The optical element 3 is a light source optical system that shapes the laser beam 2 by reflecting and refracting it. The optical element 3 shapes the laser beam 2 emitted from the laser light source 1 into a substantially parallel beam in the main scanning direction, and condenses the laser beam 2 in the vicinity of a deflecting surface 4a of the polygonal mirror 4 in the sub scanning direction. The laser beam 2 shaped by the optical element 3 is incident on the polygonal mirror 4. The polygonal mirror 4 reflects the incident laser beam 2 at a deflecting surface 4a to thereby deflect the beam 2 in the main scanning direction. The laser beam 2 deflected by the polygonal mirror 4 is reflected and refracted by the scanning optical system 5, and is condensed into a spot on the photosensitive body 6. The main scanning direction is a direction in which the laser beam 2 scans the photosensitive body 6. The sub scanning direction is a direction vertical to the main scanning direction.

Figure 2:
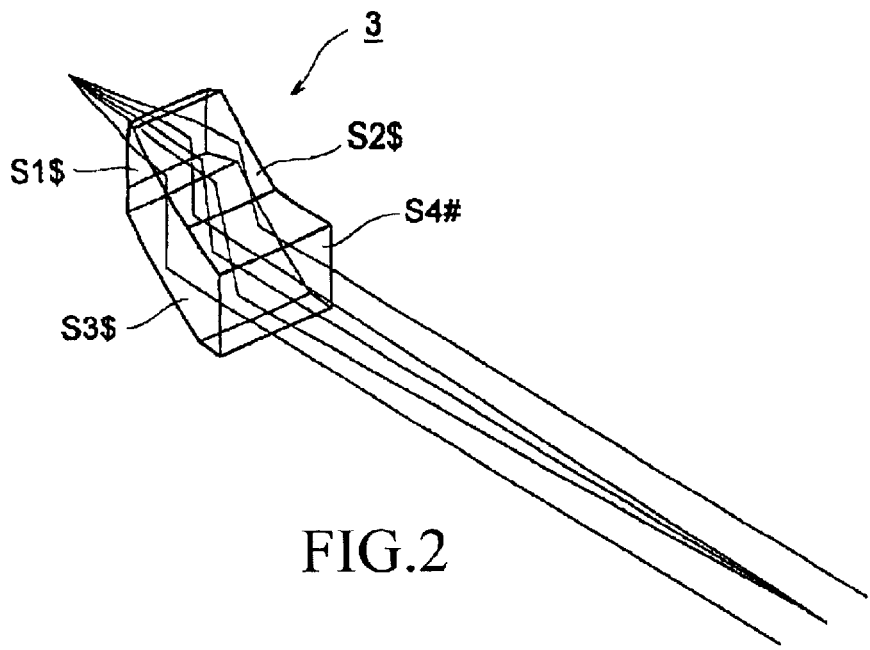
FIG. 2 is a perspective view showing an optical element constituting a first embodiment (first example)
Figure 3A:
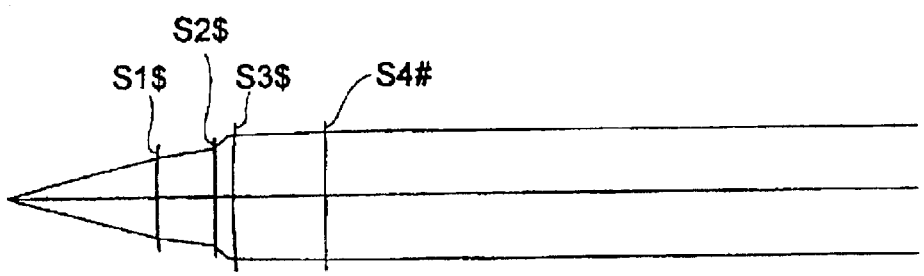
FIGS. 3A and 3B are optical structure views showing a cross section in a main scanning direction and a cross section in a sub scanning direction of the optical element constituting the first embodiment (first example)
Figure 3B:
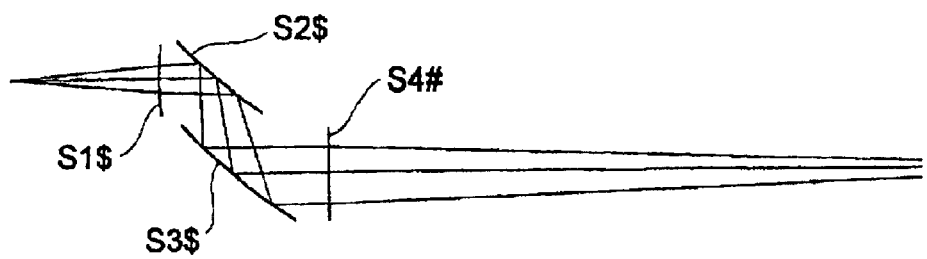
Figure 8:
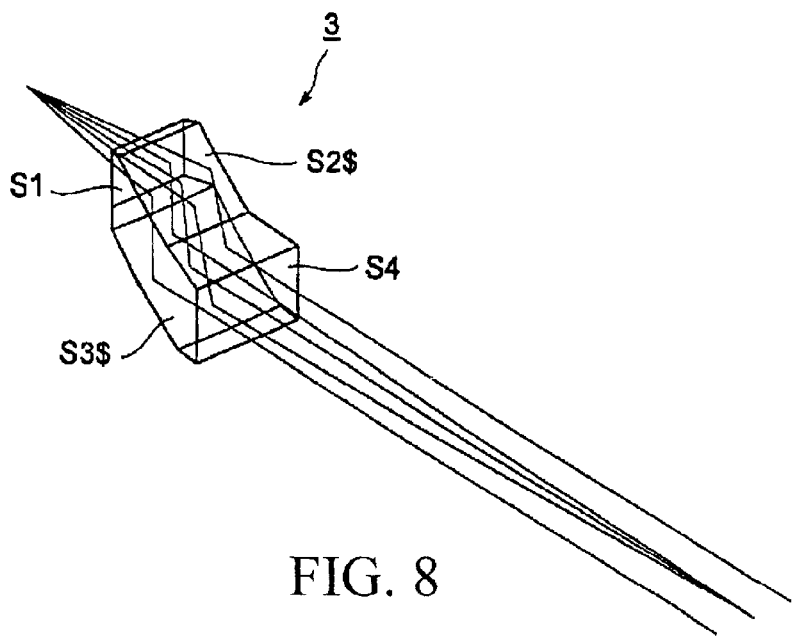
FIG. 8 is a perspective view showing an optical element constituting a second embodiment (second example)
Figure 9A:
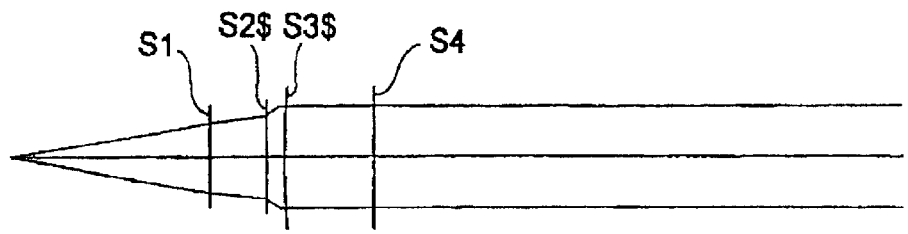
FIGS. 9A and 9B are optical structure views showing a cross section in the main scanning direction and a cross section in the sub scanning direction of the optical element constituting the second embodiment (second example)
Figure 9B:
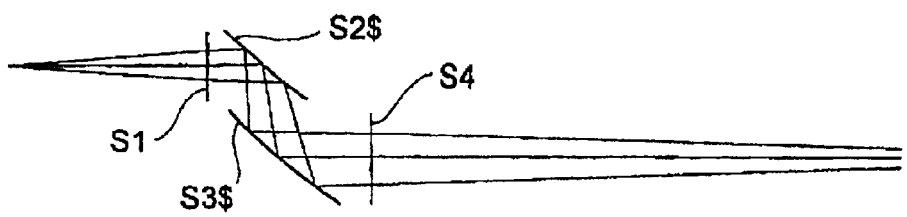
Figure 10:
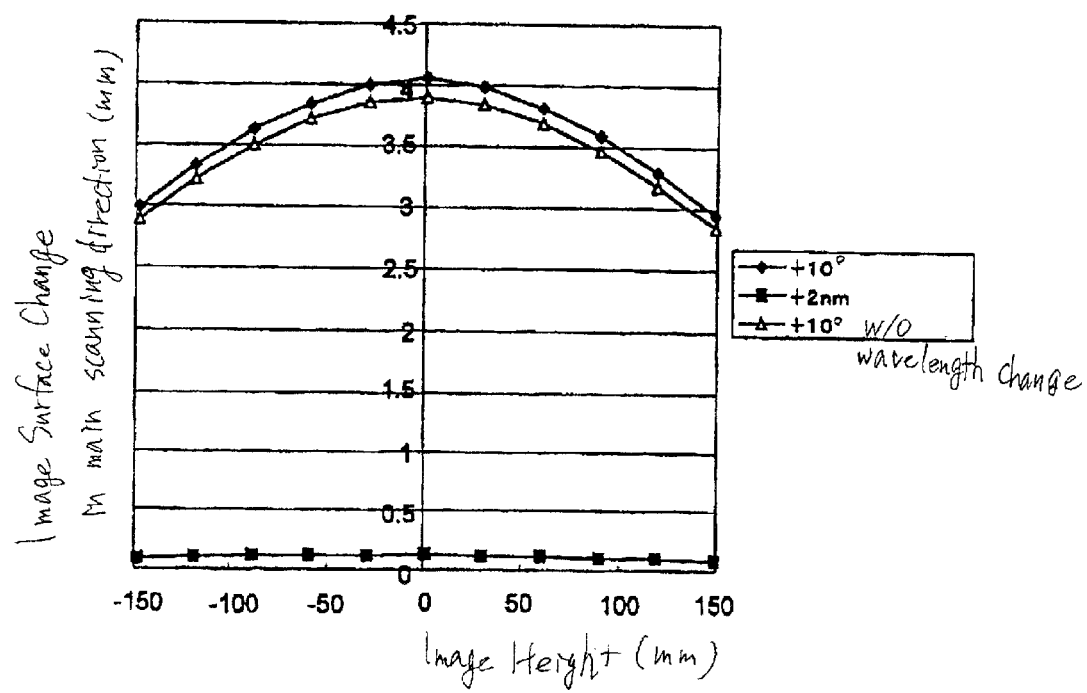
FIG. 10 is a graph showing a result of a simulation of image surface changes in the main scanning direction in the second example.
Figure 11:
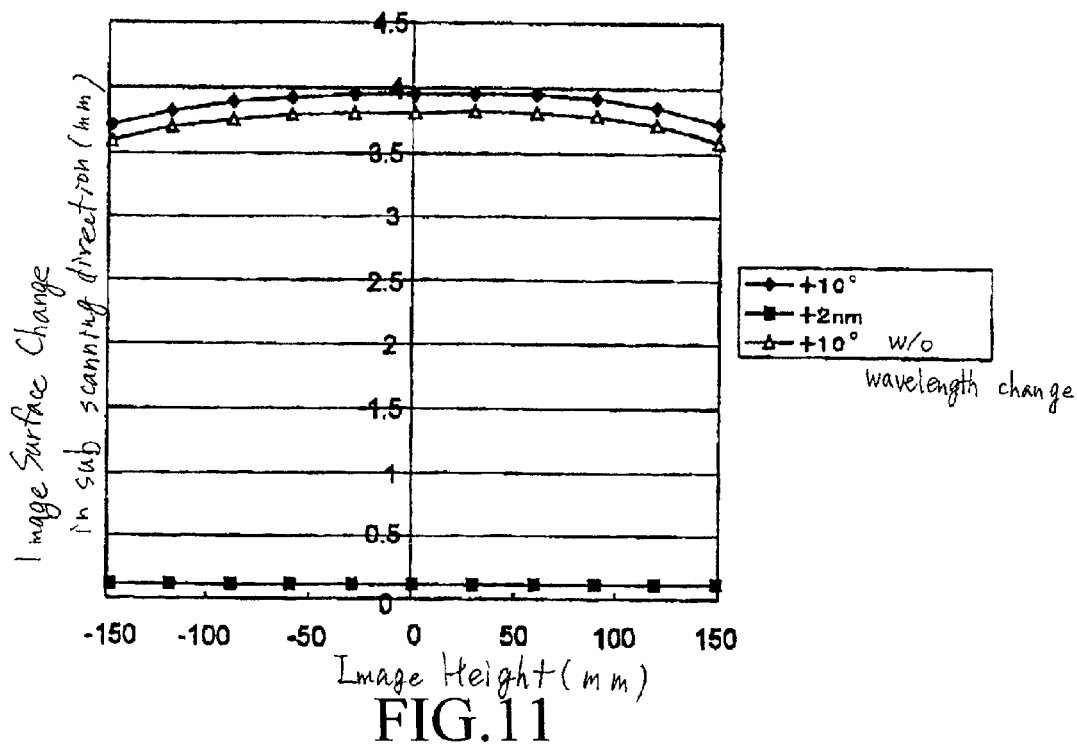
FIG. 11 is a graph showing a result of a simulation of image surface changes in the sub scanning direction in the second example.
Figure 12:
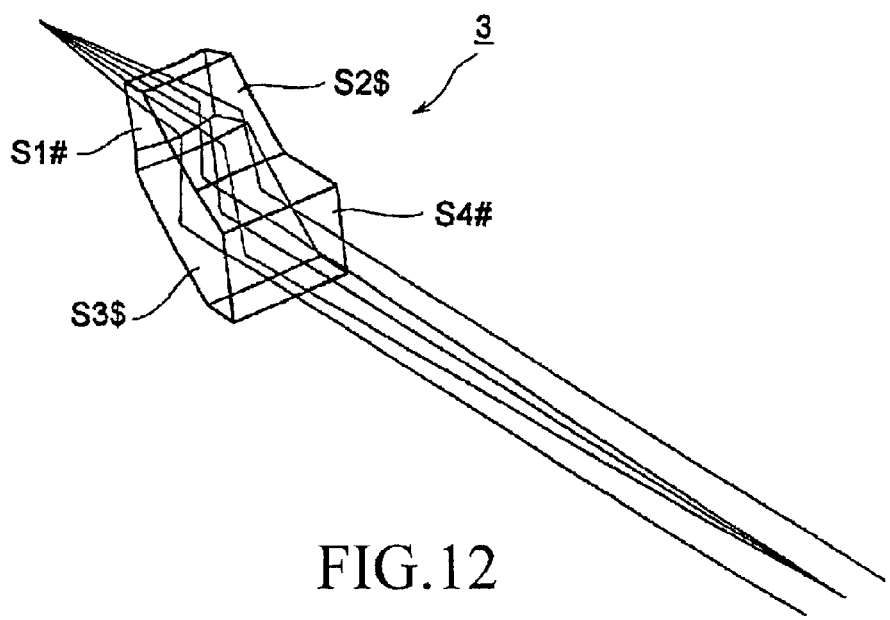
FIG. 12 is a perspective view showing an optical element constituting a third embodiment (third example)
Figure 13A:
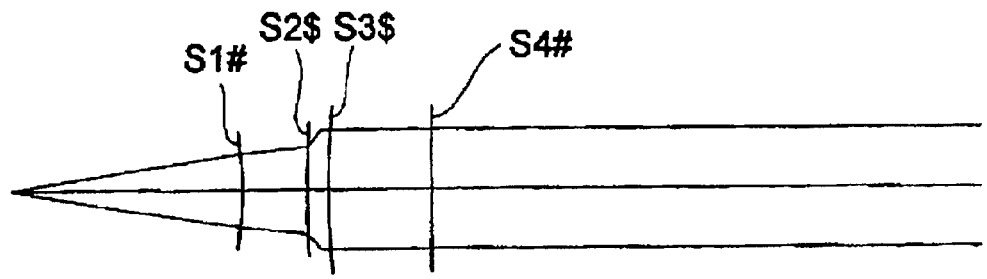
FIGS. 13A and 13B are optical structure views showing across section in the main scanning direction and a cross section in the sub scanning direction of the optical element constituting the third embodiment (third example)
Figure 13B:
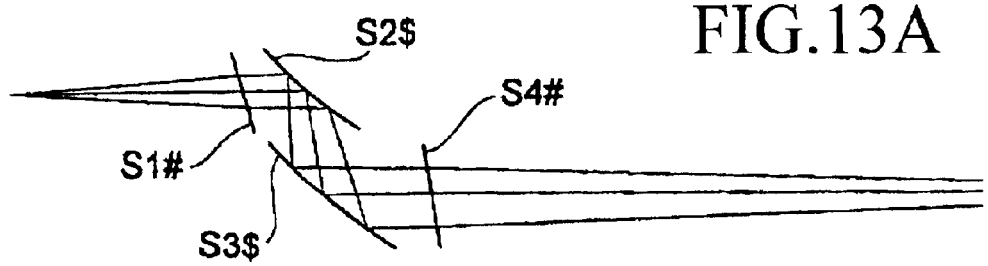
Figure 18:
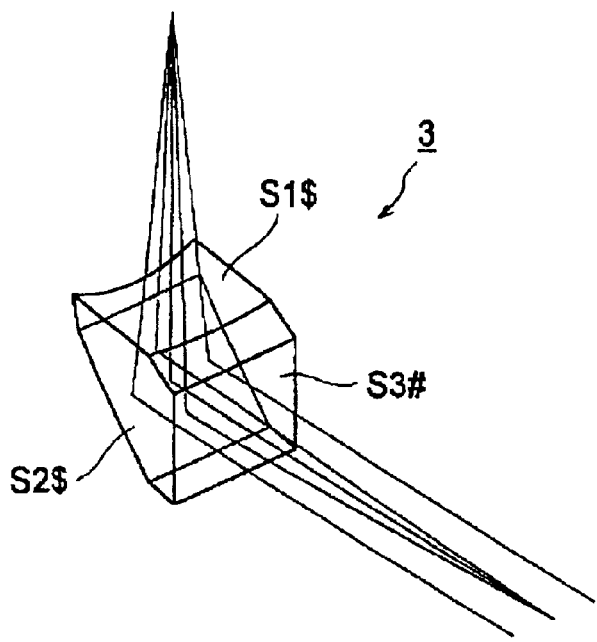
FIG. 18 is a perspective view showing an optical element constituting a fourth embodiment (fourth example)
Figure 19A:
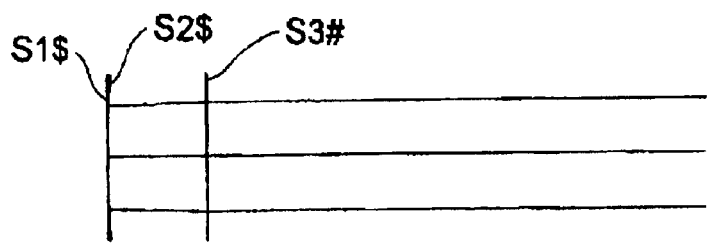
FIGS. 19A and 19B are optical structure views showing a cross section in the main scanning direction and a cross section in the sub scanning direction of the optical element constituting the fourth embodiment (fourth example)
Figure 19B:
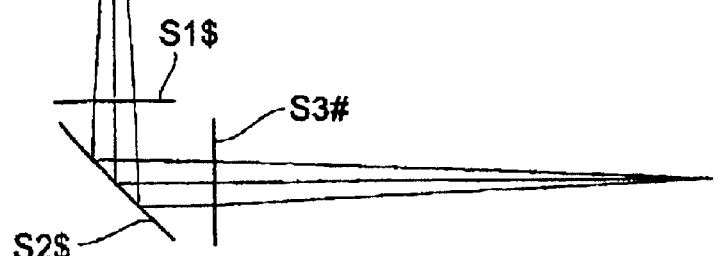

The laser scanner according to the present invention features the light source optical system constituted by one optical element 3. The basic structures of the other optical members (FIG. 1) are common to all the embodiments. FIGS. 2, 3A and 3B show a schematic optical structure of the optical element 3 of a first embodiment. FIGS. 8, 9A and 9A show a schematic optical structure of the optical element 3 of a second embodiment. FIGS. 12, 13A and 13B show a schematic optical structure of the optical element 3 of a third embodiment. FIGS. 18, 19A and 19B show a schematic optical structure of the optical element 3 of a fourth embodiment. FIGS. 2, 8, 12 and 18 show the optical elements 3 and the optical paths viewed from a slanting direction. FIGS. 3A, 9A, 13A and 19A show the optical surfaces and the optical paths on a cross section in the main scanning direction.

FIGS. 3B, 9B, 13B and 19B show the optical surfaces and the optical paths on a cross section in the sub scanning direction. In the optical structure views, the surfaces marked with Si(i=1,2, . . . ) are the it-th surfaces counted from the side of the laser light source 1 along the optical paths. The surfaces marked with Si followed by $ are surfaces having no symmetry axis of rotation (in other words, free-form surfaces). The surfaces marked with Si followed by # are diffracting surfaces.

In the embodiments, the optical element 3 is made of resin, and has four optical surfaces in the first to third embodiments and three optical surfaces in the fourth embodiment. Of the optical surfaces, at least one surface is a reflecting surface having no symmetry axis of rotation and two surfaces are transmitting surfaces. One of the transmitting surfaces is a transmitting surface (S1) on the light incident side (that is, the side of the laser light source 1), and the other transmitting surface is a transmitting surface (S4 or S3) on the light exit side. In all the embodiments, since the optical element 3 is made of resin, weight and cost reduction is achieved, and since the reflecting surface of the optical element 3 is structured so as to totally reflect light, it is unnecessary to apply a reflection coating to the reflecting surface. Cost reduction is achieved also by this.

In the first embodiment, the light incident side transmitting surface (S1) and the two reflecting surfaces (S2, S3) are surfaces having no symmetry axis of rotation, and the light exit side transmitting surface (S4) is a diffracting surface having a structure such that fine grooves are formed on a plane surface. The grooves are elliptically formed, and arranged so that the axial principal ray passes through the center of the ellipses. By elliptically forming the grooves on the diffracting surface, a diffractive power optimized to different intensities in the main and sub scanning directions is obtained. In the second embodiment, the two reflecting surfaces (S2, S3) are surfaces having no symmetry axis of rotation, and the transmitting surfaces (S1, S4) are both plane surfaces that are not diffracting surfaces.

In the third embodiment, the two reflecting surfaces (S2, S3) are surfaces having no symmetry axis of rotation, and the transmitting surfaces (S1, S4) are both diffracting surfaces. The diffracting surface constituting the light incident side transmitting surface (S1) is an axisymmetric diffracting surface having a structure such that grooves are formed on a conical surface. The symmetry axis of rotation of the axisymmetric diffracting surface is outside the area of the optical surface. The diffracting surface constituting the light exit side transmitting surface (S4) has a structure such that grooves are formed on a plane surface. In the fourth embodiment, the light incident side transmitting surface (S1) and one reflecting surface (S2) are surfaces having no symmetry axis of rotation, and the light exit side transmitting surface (S3) is an axisymmetric diffracting surface having a structure such that fine grooves are formed on a plane surface. The grooves are concentrically formed, and arranged so that the axial principal ray passes through the center of the concentric circles. Since the number of reflecting surfaces is small and the diffracting surface structure is simplified, the fourth embodiment can be realized at a lower cost than the other embodiments.

When the optical element 3 is made of resin, the image surface shift caused by a temperature change is large compared to when the optical element 3 is made of glass. This is because the configuration change (expansion, shrinkage or the like) and the refractive index change caused by a temperature change are larger in resin than in glass. In the laser scanners of the embodiments, a predetermined beam shaping function (a collimator lens function, a cylinder lens function or the like) is provided by the light source optical system being constituted by one optical element 3 made of resin and the optical element 3 being provided with at least one reflecting surface which is not a plane surface. Although a performance change due to the configuration change is caused on the reflecting surface, no refractive index change that affects the performance is caused. Therefore, the performance change caused when there is a temperature change can be reduced even though the light source optical system is made of resin. Further, the optical power can be set to be weak even though no diffracting surface is used like in the second embodiment or one or two diffracting surfaces are used like in the first, third and fourth embodiments. As described below, it can be prevented that a large performance change is caused when there is a wavelength change.

In the first, third and fourth embodiments, at least one of the transmitting surfaces is a diffracting surface, and the provision of the diffracting surface suppresses the image surface shift caused by a temperature shift. This uses a fact that the oscillation wavelength of the laser diode increases when the temperature rises. The laser diode used as the laser light source 1 has a characteristic such that the oscillation wavelength increases as the temperature rises. Diffracting surfaces are sensitive to wavelength changes, and when the wavelength is changed by a temperature change, the workings of diffracting surfaces are also changed. In the first, third and fourth embodiments, the optical power of the diffracting surface and the like are set so that the direction in which the image surface is shifted by a wavelength increase and the direction in which the image surface is shifted by a temperature rise are opposite to each other. By this, an image surface change caused when there is a temperature change can be suppressed together with an image shift caused when there is a configuration change.

In the third embodiment, the transmitting surfaces (S1, S4) are both diffracting surfaces, and the directions of diffraction angle changes on the two diffracting surfaces (S1, S4) caused when there is a wavelength change are opposite to each other. While the transmitting surfaces (S1, S4) are both inclined with respect to the sub scanning direction in the schematic structure as shown in FIG. 13B, the optical element 3 is designed so that the principal ray of the laser beam 2 travels substantially in a straight line by diffraction. That is, as a result of the refractive power on each of the transmitting surfaces (S1, S4) being canceled out by the optical power of the diffracting surface, the principal ray obliquely incident on the transmitting surfaces (S1, S4) passes through the transmitting surfaces (S1, S4) in a straight line without its direction changed. In a case where the optical element 3 is designed so that the principal ray passes through the inclined diffracting surfaces in a straight line as described above, when the wavelength changes, the direction of diffraction also changes, so that the position of beam condensation shifts. However, by designing the optical element 3 so that the directions of diffraction angle changes caused when there is a wavelength change are opposite to each other like in the third embodiment, the change of the working of the diffracting surface is canceled out when the wavelength changes, so that the position of beam condensation does not shift in the optical element 3 as a whole.

EXAMPLES

Hereinafter, the laser scanner embodying the present invention will more concretely be described with reference to construction data of the optical element 3 constituting the laser scanner. First to fourth examples shown below correspond to the above-described first to fourth embodiments. The optical structure views (FIGS. 2, 3A, 3B, 8, 9A, 9B, 12, 13A, 13B, 18, 19A and 19B) of the optical elements 3 in the first to fourth examples show the optical structures of the optical elements 3 of the corresponding first to fourth examples.

TABLEs 1, 6, 9 and 16 show coordinate data of the optical surfaces of the optical elements 3 constituting the first to fourth examples. These coordinate data show the origins of local coordinate systems (x, y, z) in global coordinate systems (X, Y, Z), and the disposition of the optical surfaces by vectors. TABLEs 2 to 4, 7, 8, 10 to 13, 17 and 18 show configuration data of the optical surfaces of the optical elements 3 constituting the first to fourth examples. The configurations of the free-form surfaces are expressed by the expression ($1) shown below, and the configurations of the axisymmetric diffracting surfaces are expressed by the expression ($2) shown below. TABLEs 5, 14, 15 and 19 show coefficients of phase functions p of the diffracting surfaces used for the optical elements 3 of the first, third and fourth examples. The phase functions p of the diffracting surfaces are expressed by the expression (#1) shown below, and the phase functions p of the axisymmetric diffracting surfaces are expressed by the expression (#2) shown below.

$$x = \sum_{i=0}^{10} \sum_{j=0}^{6} a_{ij} y^i z^j \qquad (\$1)$$

$$x = \sum_{i=0}^{1} a_i \left(\sqrt{y^2 + z^2}\right)^i \qquad (\$2)$$

$$p = \sum_{i=0}^{2} \sum_{j=0}^{2} b_{ij} y^i z^j \qquad (\#1)$$

$$p = \sum_{i=0}^{2} b_i \left(\sqrt{y^2 + z^2}\right)^i \qquad (\#2)$$

Figure 4:
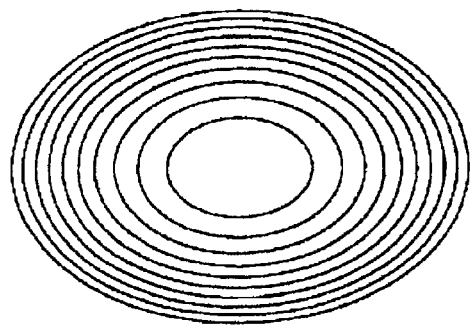
FIG. 4 is a plan view showing the groove configuration of a diffracting surface of the optical element constituting the first example.
Figure 5:
FIG. 5 is a cross-sectional view showing the groove configuration of the diffracting surface of the optical element constituting the first example.
Figure 6:
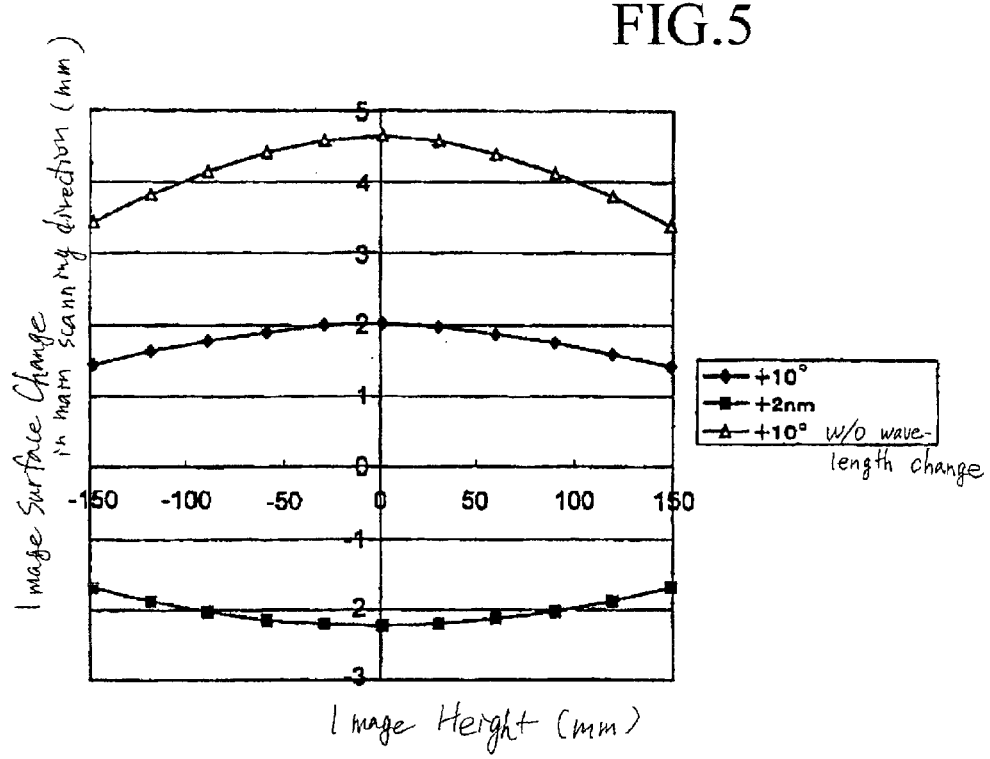
FIG. 6 is a graph showing a result of a simulation of image surface changes in the main scanning direction in the first example.
Figure 7:
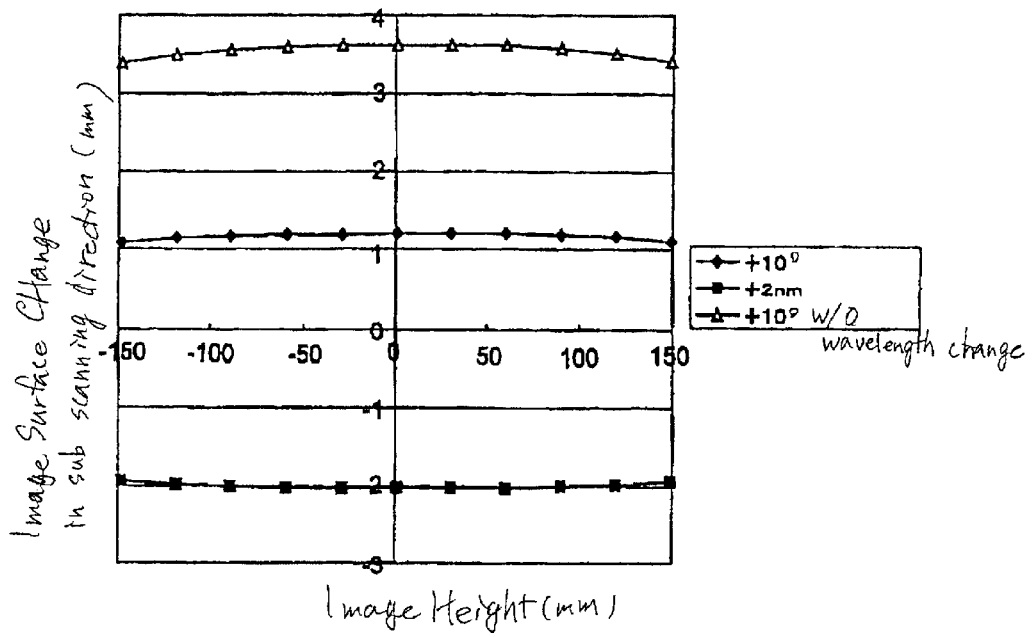
FIG. 7 is a graph showing a result of a simulation of image surface changes in the sub scanning direction in the first example.

FIG. 4 shows the groove configuration of the diffracting surface of the optical element 3 constituting the first example. For ease of view, five grooves are shown as one groove. The grooves are elliptically formed, and have different diffractive powers in the main scanning direction and in the sub scanning direction. FIG. 5 shows the cross-sectional configuration (cross section including the surface normal) of the diffracting surface of the optical element 3 constituting the first example. For ease of view, the cross section is magnified in the vertical direction of FIG. 5 (the direction of the surface normal) by 100 times in length-to-width ratio. As shown in FIG. 5, the surface is constituted by an aggregation of curved surfaces. The curved surfaces are surfaces having no symmetry axis of rotation.

Figure 14A:
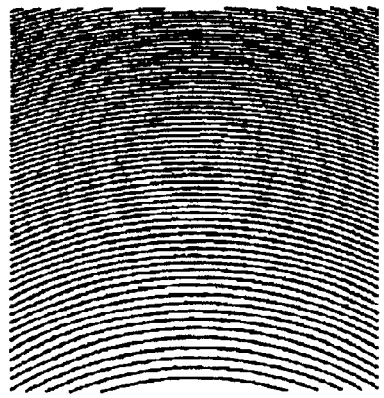
FIG. 14 is a plan view showing the groove configuration of a diffracting surface of the optical element constituting the third example.
Figure 14B:
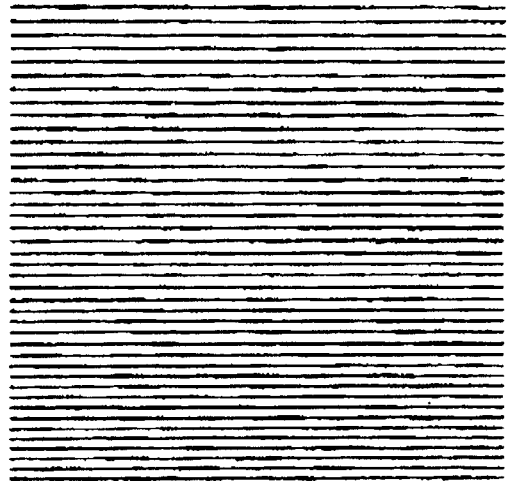
Figure 15A:
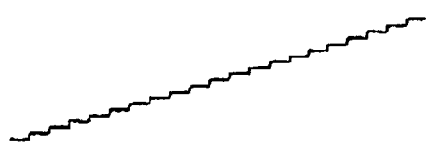
FIG. 15 is a cross-sectional view showing the groove configuration of the diffracting surface of the optical element constituting the third example.
Figure 15B:
Figure 16:
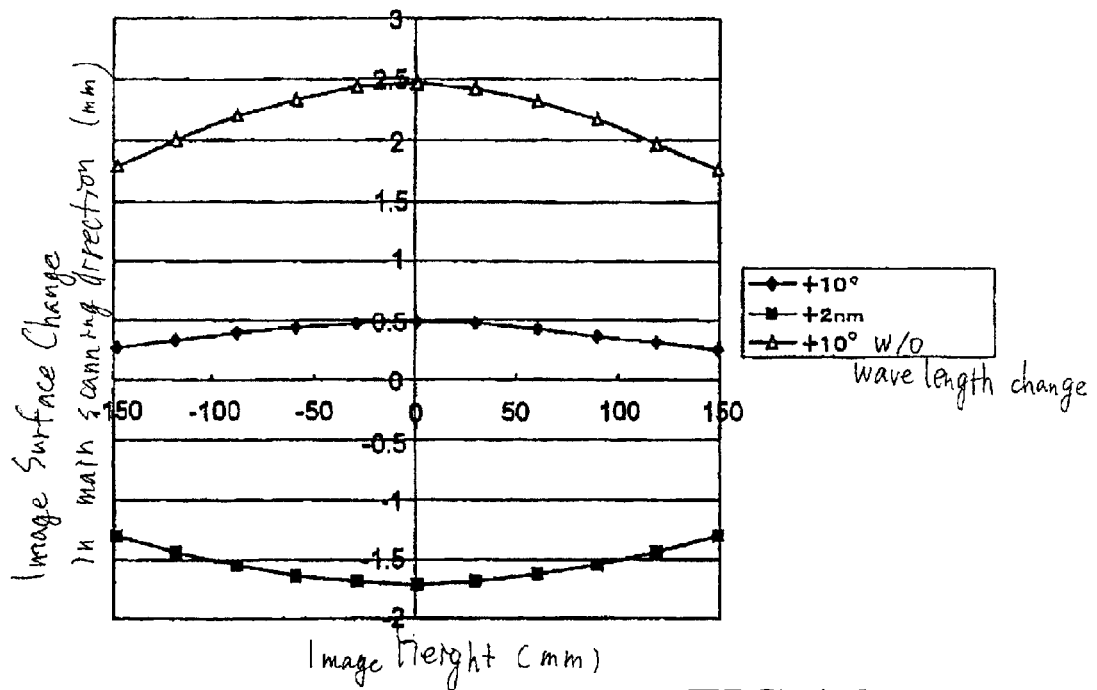
FIG. 16 is a graph showing a result of a simulation of image surface changes in the main scanning direction in the third example.
Figure 17:
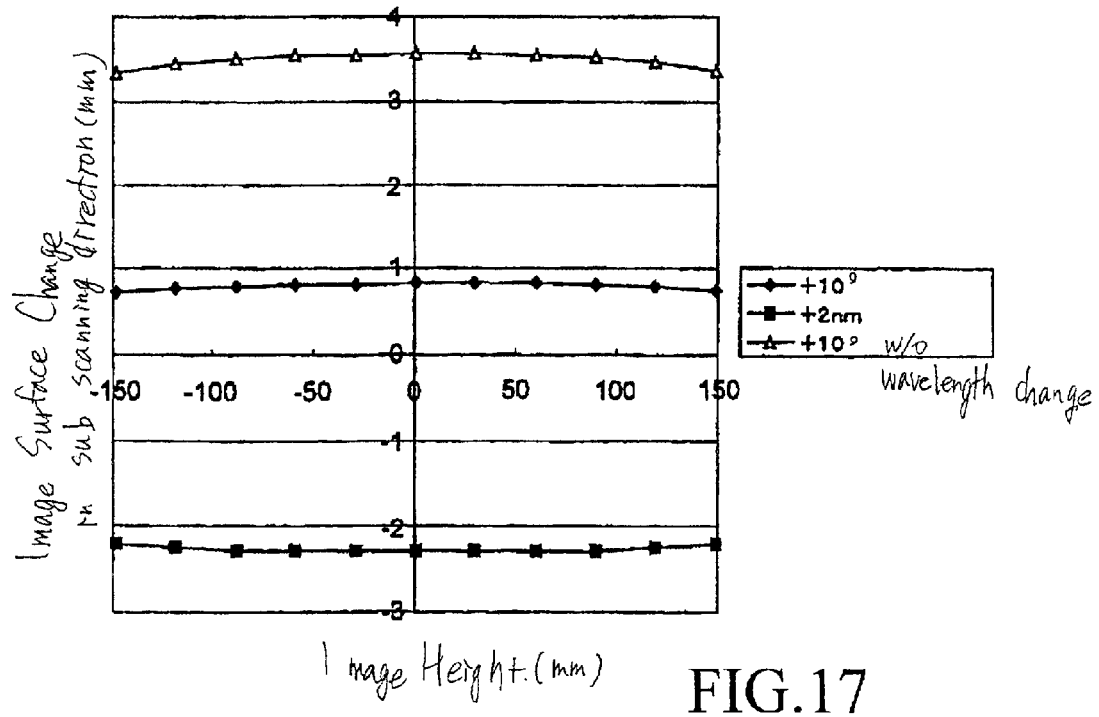
FIG. 17 is a graph showing a result of a simulation of image surface changes in the sub scanning direction in the third example.

FIGS. 14A and 14B show the groove configurations of the diffracting surfaces of the optical element 3 constituting the third example. FIG. 14A shows the groove configuration of the axisymmetric diffracting surface formed on the transmitting surface (S1). FIG. 14B shows the groove configuration of the diffracting surface formed on the transmitting surface (S4). For ease of view, ten grooves are shown as one groove. On the transmitting surface (S1), the grooves formed on the conical surface are arcs whose center is the same as the center of the symmetry axis of rotation of the cone. On the transmitting surface (S4), the grooves formed on the plane surface are parallel straight lines. The grooves are not uniformly spaced on both of the diffracting surfaces (S1, S4). FIGS. 15A and 15B show the cross-sectional configuration (cross section including the surface normal) of the diffracting surface of the optical element 3 constituting the third example. FIG. 15A shows the groove configuration of the axisymmetric diffracting surface formed on the transmitting surface (S1). FIG. 15B shows the groove configuration of the diffracting surface formed on the transmitting surface (S4). As shown in FIGS. 15A and 15B, the surfaces are each constituted by an aggregation of plane surfaces. On the diffracting surface (S1) formed on the conical surface, the parts of the standing walls are cylindrical surfaces although the surfaces where light passes are plane surfaces.

In the third example, although the two diffracting surfaces (S1, S4) are both inclined in the schematic structure as mentioned above, the principal ray travels substantially in a straight line by diffraction. At this time, although the directions of diffraction change when the wavelength changes, by canceling out the direction change by the two diffracting surfaces (S1, S4), the position of beam condensation does not shift due to the wavelength change in the optical element 3 as a whole.

Figure 20:
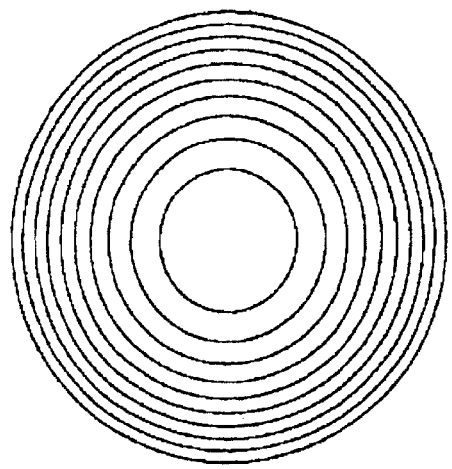
FIG. 20 is a plan view showing the groove configuration of a diffracting surface of the optical element constituting the fourth example.
Figure 21:
FIG. 21 is a cross-sectional view showing the groove configuration of the diffracting surface of the optical element constituting the fourth example.
Figure 22:
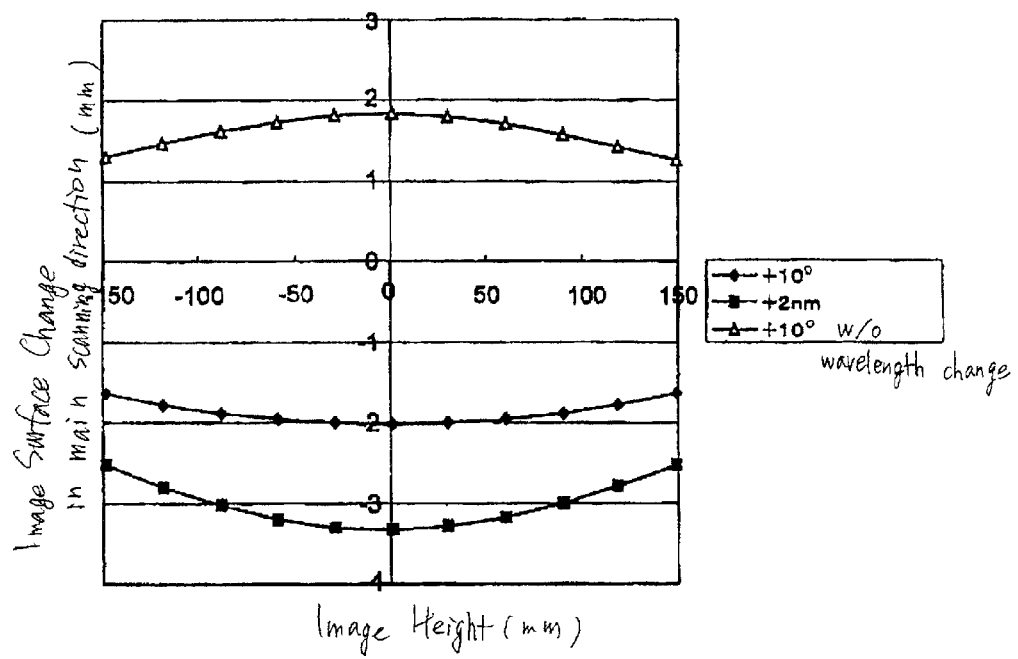
FIG. 22 is a graph showing a result of a simulation of image surface changes in the main scanning direction in the fourth example.
Figure 23:
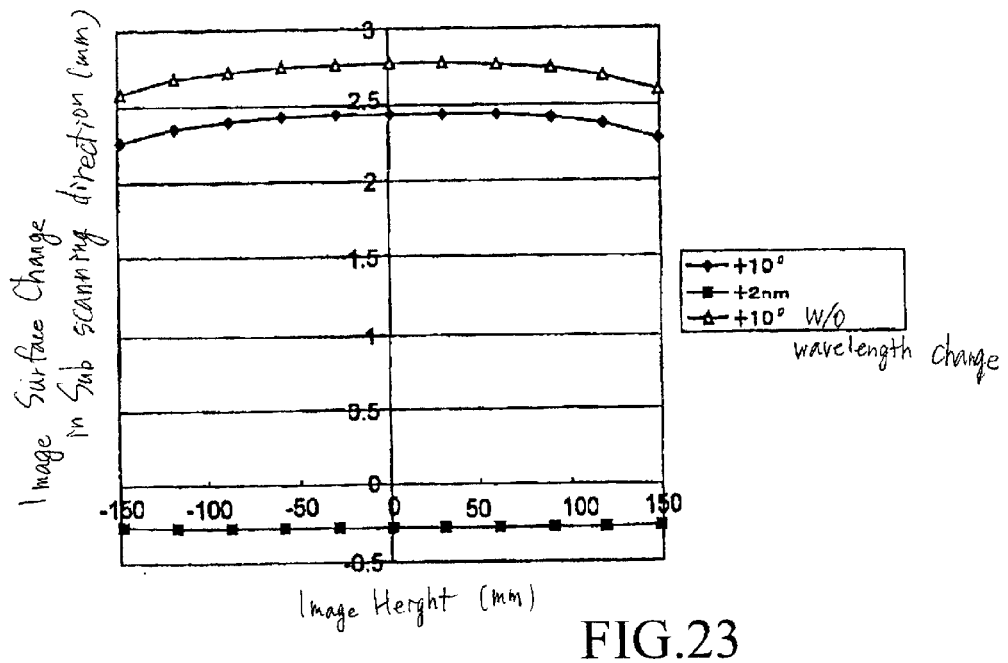
FIG. 23 is a graph showing a result of a simulation of image surface changes in the sub scanning direction in the fourth example.
Figure 24:
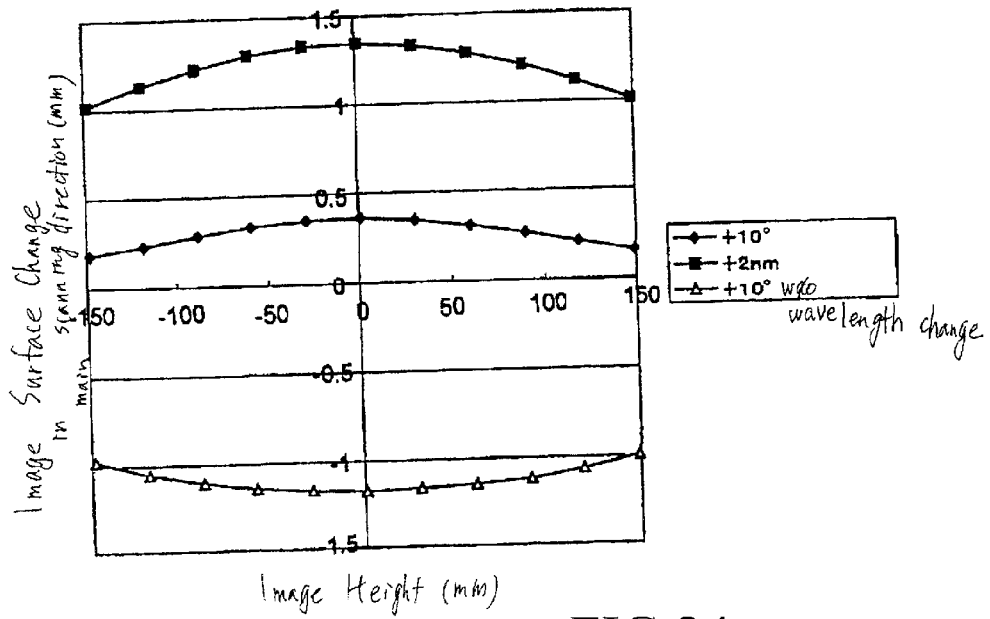
FIG. 24 is a graph showing a result of a simulation of image surface changes in the main scanning direction in a first comparative example.
Figure 25:
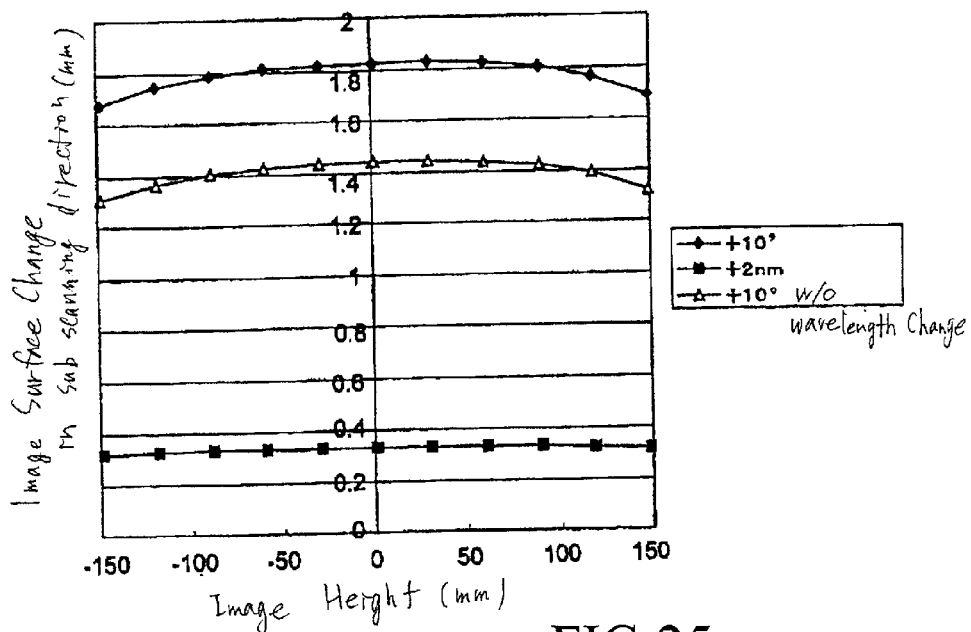
FIG. 25 is a graph showing a result of a simulation of image surface changes in the sub scanning direction in the first comparative example.
Figure 26:
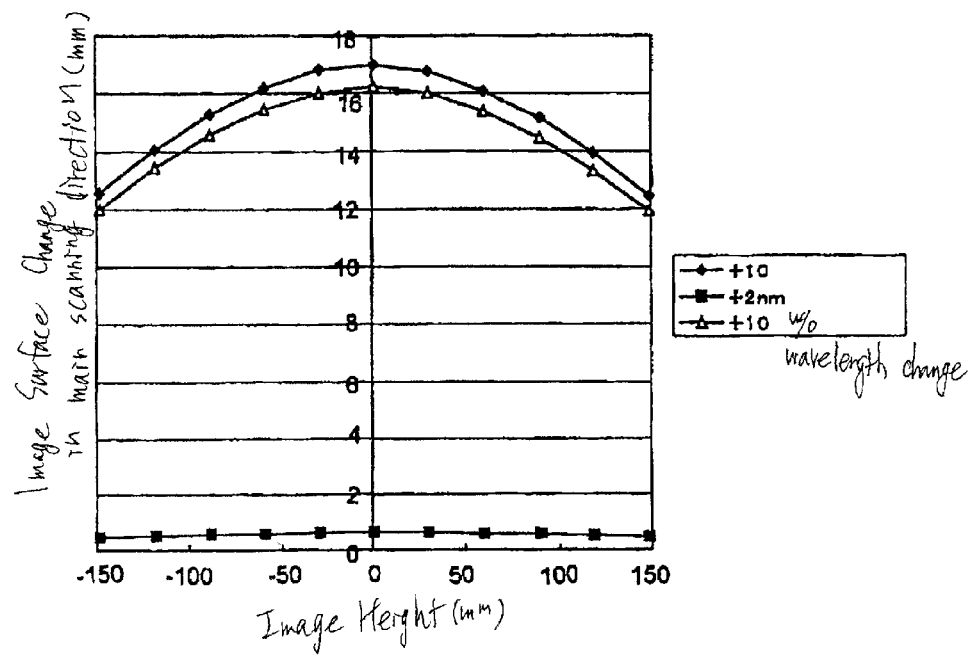
FIG. 26 is a graph showing a result of a simulation of image surface changes in the main scanning direction in a second comparative example.
Figure 27:
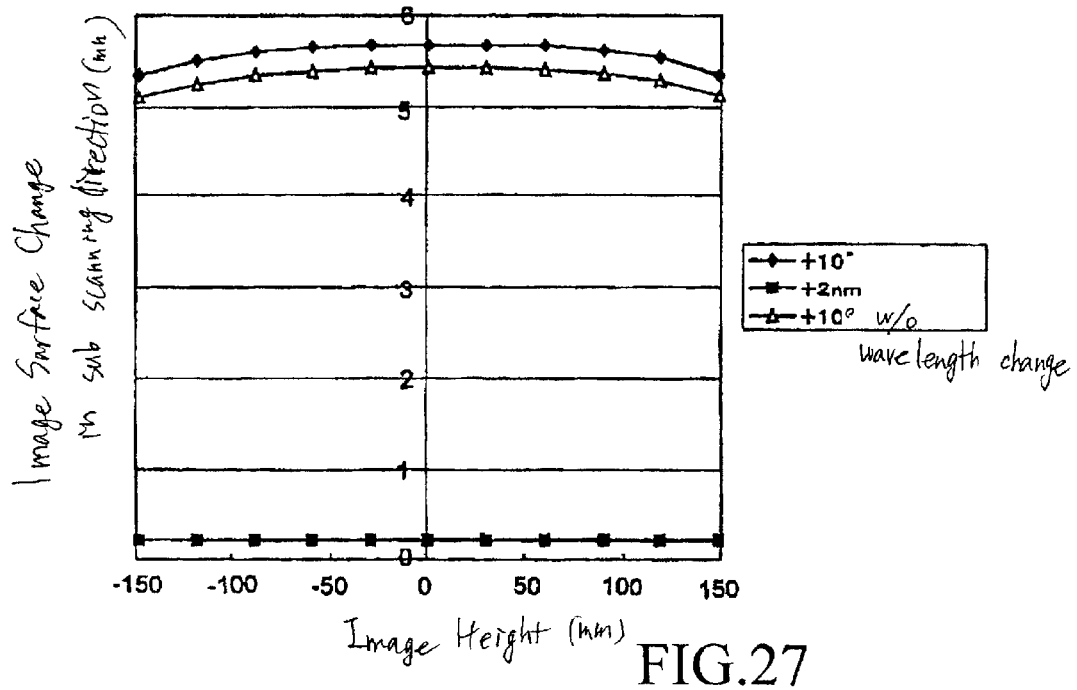
FIG. 27 is a graph showing a result of a simulation of image surface changes in the sub scanning direction in the second comparative example.
Figure 28:
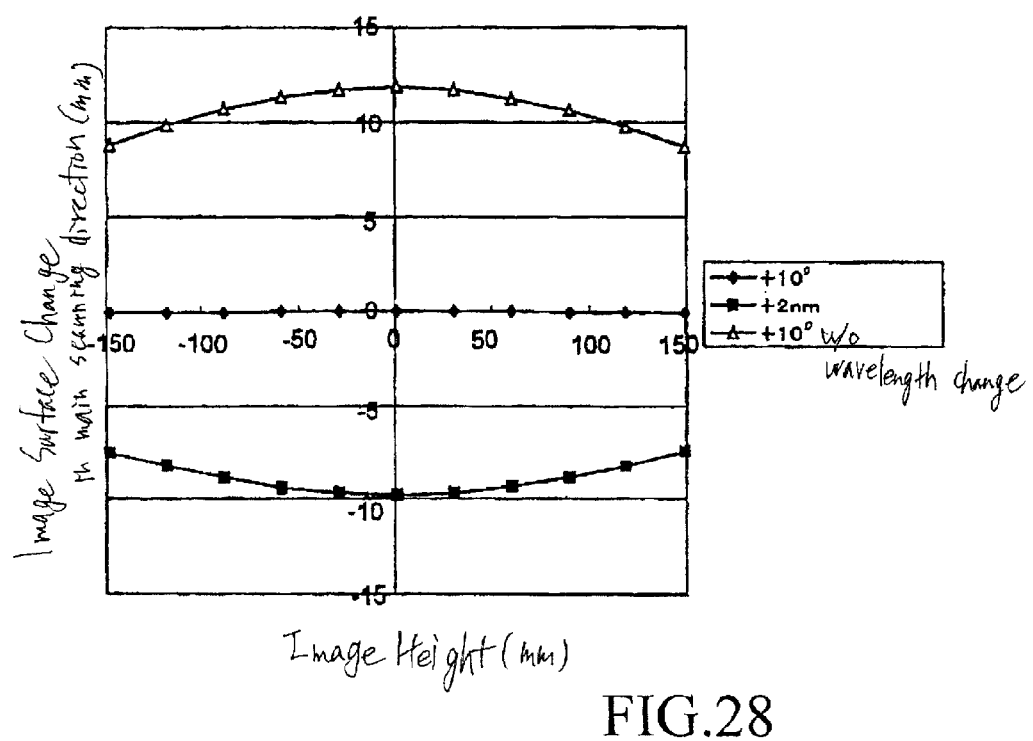
FIG. 28 is a graph showing a result of a simulation of image surface changes in the main scanning direction in a third comparative example.
Figure 29:
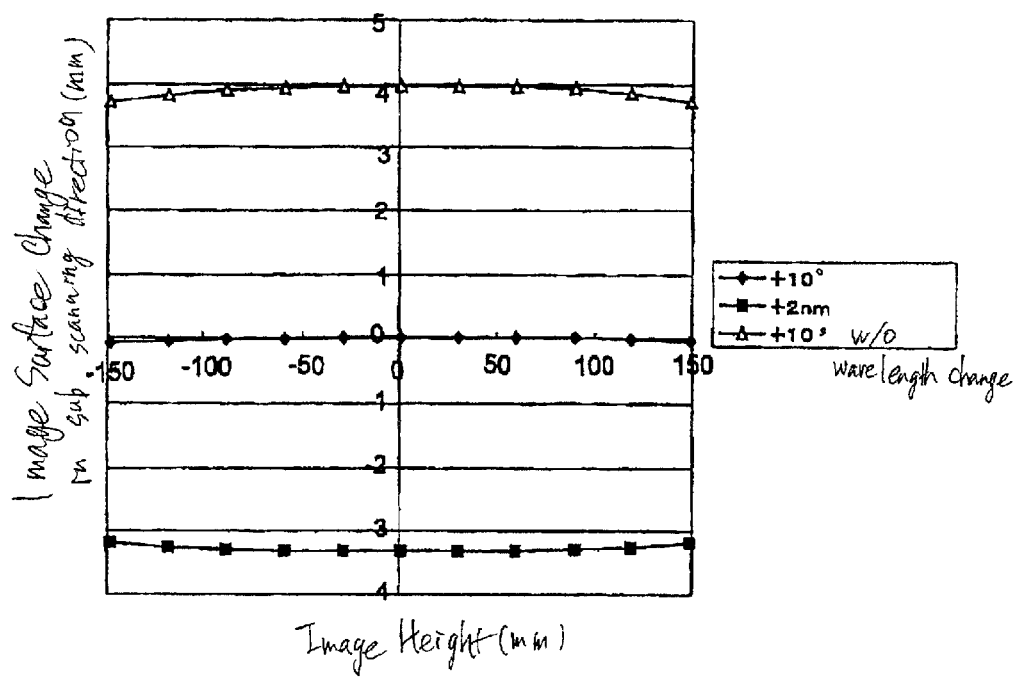
FIG. 29 is a graph showing a result of a simulation of image surface changes in the sub scanning direction in the third comparative example.

FIG. 20 shows the groove configuration of the diffracting surface of the optical element 3 constituting the fourth embodiment. For ease of view, five grooves are shown as one groove. Since the grooves are formed concentrically, the diffractive power is the same in the main and sub scanning directions. FIG. 21 shows the cross-sectional configuration (cross section including the surface normal) of the diffracting surface of the optical element 3 constituting the fourth example. For ease of view, the cross section is magnified in the vertical direction of FIG. 21 (the direction of the surface normal) by 100 times in length-to-width ratio. As shown in FIG. 21, the surface is constituted by an aggregation of curved surfaces.

FIGS. 6, 7, 10, 11, 16, 17, 22, 23, 24, 25, 26, 27, 28 and 29 show results of simulations of image surface changes (mm) caused when there is a temperature or wavelength change in the first to fourth examples and first to third comparative examples (the horizontal axis represents the image height in millimeters in the main scanning direction). FIGS. 6, 10, 16, 22, 24, 26 and 28 show image surface changes in the main scanning direction in the first to fourth examples and the first to third comparative examples. FIGS. 7, 11, 17, 23, 25, 27 and 29 show image surface changes in the sub scanning direction in the first to fourth examples and the first to third comparative examples. The lines plotted by ♦ are image surface changes caused when the temperature rises by 10 degrees. The lines plotted by ■ show image surface changes caused when the wavelength increases by 2 nm. The lines plotted by Δ show image surface changes caused when the temperature rises by 10 degrees and the wavelength does not change for comparison.

Since almost all of the image surface changes caused when there is a wavelength change are due to the workings of the diffracting surfaces, the lines plotted by Δ can be considered substantially the same as the lines obtained when no diffracting surface is used. The change in the oscillation wavelength of the laser diode caused when the temperature rises by 10 degrees is approximately 2 nm. Therefore, the sum of the image surface change (Δ) caused when the temperature rises by 10 degrees and the wavelength does not change and the image surface change (■) caused when the wavelength increases by 2 nm is substantially the same as the image surface change (♦) caused when the temperature rises by 10 degrees.

In the first to third comparative examples, an axisymmetric collimator lens and cylinder lens are used instead of the optical element 3 in the specifications similar to those of the embodiments. However, in the first comparative example, the collimator lens and the cylinder lens are both made of glass, and in the second and third comparative examples, the collimator lens and the cylinder lens are both made of resin. Although the second comparative example uses no diffracting surface, the third comparative example uses one diffracting surface for each of the collimator lens and the cylinder lens to thereby control the performance change when there is a temperature change. The first comparative example is excellent in performance but is high in cost compared to the first to fourth examples because it is made of glass. The second comparative example is inexpensive because it is made of resin, but is inferior in performance to the first to fourth examples because it uses no reflecting surface. The third comparative example is inexpensive because it is made of resin, and the performance change caused when there is a temperature change is sufficiently suppressed. However, the performance change caused when there is a wavelength change is large.

As described above, according to the present embodiments, since not only the light source optical system is constituted by one optical element made of resin but also the optical element is provided with at least one reflecting surface having no symmetry axis of rotation, the laser scanner can be reduced in cost and the performance change caused by temperature and wavelength changes can be reduced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

TABLE 1

| | Example 1 . . . coordinate data of the optical surfaces | | | | | | | | |
|---|---|---|---|---|---|---|---|---|---|
| | | origins of local coordinate systems | | | x vector of local coordinate systems | | | y vector of local coordinate systems | |
| Surface | | X | Y | Z | X | Y | Z | X | Y, Z |
| S1 free-formed | | 0.00 | 53.77 | 0.00 | 0.0000 | −1.0000 | 0.0000 | 1.0000 | 0.0000 |
| S2 free-formed | | 0.00 | 50.65 | 0.00 | 0.0000 | −0.6428 | 0.7660 | 1.0000 | 0.0000 |

TABLE 1-continued

Example 1 . . . coordinate data of the optical surfaces

| | | origins of local coordinate systems | | | x vector of local coordinate systems | | | y vector of local coordinate systems | |
|---|---|---|---|---|---|---|---|---|---|
| Surface | | X | Y | Z | X | Y | Z | X | Y, Z |
| S3 free-formed | | 0.00 | 49.77 | −5.00 | 0.0000 | 0.6428 | −0.7660 | 1.0000 | 0.0000 |
| S4 free-formed | | 0.00 | 44.77 | −5.00 | 0.0000 | −1.0000 | 0.0000 | 1.0000 | 0.0000 |

TABLE 2

Example 1 . . . configuration data $a_{ij}$ of the first surface (S1)

| | | | j | | |
|---|---|---|---|---|---|
| i | 0 | 1 | 2 | 3 | 4 |
| 0 | 0.00000 | 0.00000 | $2.70489 * 10^{-2}$ | $-2.46735 * 10^{-3}$ | $4.93644 * 10^{-4}$ |
| 2 | $9.65977 * 10^{-3}$ | $3.51036 * 10^{-3}$ | $1.69484 * 10^{-4}$ | $1.41582 * 10^{-4}$ | 0.00000 |
| 4 | $7.63719 * 10^{-4}$ | $-6.41266 * 10^{-6}$ | 0.00000 | 0.00000 | 0.00000 |

TABLE 3

Example 1 . . . configuration data $a_{ij}$ of the second surface (S2)

| | | | | j | | | |
|---|---|---|---|---|---|---|---|
| i | 0 | 1 | 2 | 3 | 4 | 5 | 6 |
| 0 | 0.00000 | 0.00000 | $1.81264 * 10^{-2}$ | $-4.95934 * 10^{-4}$ | $5.85072 * 10^{-5}$ | $-4.50839 * 10^{-6}$ | $3.91027 * 10^{-7}$ |
| 2 | $-3.49770 * 10^{-4}$ | $8.24262 * 10^{-4}$ | $-8.13281 * 10^{-5}$ | $8.35928 * 10^{-6}$ | $-6.17103 * 10^{-7}$ | 0.00000 | 0.00000 |
| 4 | $1.51558 * 10^{-5}$ | $-3.07229 * 10^{-6}$ | $6.09714 * 10^{-9}$ | $-6.20261 * 10^{-7}$ | 0.00000 | 0.00000 | 0.00000 |
| 6 | $-1.10212 * 10^{-6}$ | $-1.94448 * 10^{-7}$ | $2.19668 * 10^{-8}$ | 0.00000 | 0.00000 | 0.00000 | 0.00000 |
| 8 | $1.93562 * 10^{-7}$ | $8.10479 * 10^{-9}$ | 0.00000 | 0.00000 | 0.00000 | 0.00000 | 0.00000 |
| 10 | $-8.39267 * 10^{-9}$ | 0.00000 | 0.00000 | 0.00000 | 0.00000 | 0.00000 | 0.00000 |

TABLE 4

Example 1 . . . configuration data $a_{ij}$ of the third surface (S3)

| | | | | j | | | |
|---|---|---|---|---|---|---|---|
| i | 0 | 1 | 2 | 3 | 4 | 5 | 6 |
| 0 | 0.00000 | 0.00000 | $-1.49589 * 10^{-2}$ | $1.91755 * 10^{-4}$ | $-4.71251 * 10^{-6}$ | $1.17646 * 10^{-7}$ | $2.37242 * 10^{-8}$ |
| 2 | $-1.50023 * 10^{-2}$ | $2.74410 * 10^{-4}$ | $5.36367 * 10^{-6}$ | $-2.32047 * 10^{-6}$ | $2.12657 * 10^{-7}$ | 0.00000 | 0.00000 |
| 4 | $4.01091 * 10^{-5}$ | $-4.37622 * 10^{-6}$ | $6.69159 * 10^{-7}$ | $-1.00549 * 10^{-7}$ | 0.00000 | 0.00000 | 0.00000 |
| 6 | $6.07734 * 10^{-7}$ | $-1.04643 * 10^{-7}$ | $5.49308 * 10^{-9}$ | 0.00000 | 0.00000 | 0.00000 | 0.00000 |
| 8 | $-1.35263 * 10^{-8}$ | $-5.90017 * 10^{-10}$ | 0.00000 | 0.00000 | 0.00000 | 0.00000 | 0.00000 |
| 10 | $4.77561 * 10^{-10}$ | 0.00000 | 0.00000 | 0.00000 | 0.00000 | 0.00000 | 0.00000 |

TABLE 5

Example 1 . . . coefficient $b_{ij}$ of phase functions p of the fourth surface (S4)

| | j | |
|---|---|---|
| i | 0 | 2 |
| 0 | 0.00000 | $-1.11792 * 10$ |
| 2 | −7.05104 | 0.00000 |

TABLE 6

Example 2 . . . coordinate data of the optical surfaces

| | | origins of local coordinate systems | | | x vector of local coordinate systems | | | y vector of local coordinate systems | |
|---|---|---|---|---|---|---|---|---|---|
| Surface | | X | Y | Z | X | Y | Z | X | Y, Z |
| S1 | Flat | 0.00 | 53.81 | 0.00 | 0.0000 | −1.0000 | 0.0000 | 1.0000 | 0.0000 |
| S2 | Free-formed | 0.00 | 50.69 | 0.00 | 0.0000 | −0.6428 | 0.7660 | 1.0000 | 0.0000 |
| S3 | Free-formed | 0.00 | 49.81 | −5.00 | 0.0000 | 0.6428 | −0.7660 | 1.0000 | 0.0000 |
| S4 | Flat | 0.00 | 44.81 | −5.00 | 0.0000 | −1.0000 | 0.0000 | 1.0000 | 0.0000 |

TABLE 7

Example 2 . . . configuration data $a_{ij}$ of the second surface (S2)

| | j | | | | | | |
|---|---|---|---|---|---|---|---|
| i | 0 | 1 | 2 | 3 | 4 | 5 | 6 |
| 0 | 0.00000 | 0.00000 | $1.38024 * 10^{-2}$ | $-1.47351 * 10^{-4}$ | $3.10369 * 10^{-5}$ | $-3.32729 * 10^{-6}$ | $1.59651 * 10^{-6}$ |
| 2 | $1.80246 * 10^{-4}$ | $6.06191 * 10^{-4}$ | $-6.48022 * 10^{-5}$ | $6.80711 * 10^{-6}$ | $8.51042 * 10^{-7}$ | 0.00000 | 0.00000 |
| 4 | $-1.30531 * 10^{-5}$ | $2.28048 * 10^{-6}$ | $-2.85520 * 10^{-7}$ | $-8.77701 * 10^{-7}$ | 0.00000 | 0.00000 | 0.00000 |
| 6 | $7.65995 * 10^{-7}$ | $-8.42971 * 10^{-7}$ | $9.43848 * 10^{-8}$ | 0.00000 | 0.00000 | 0.00000 | 0.00000 |
| 8 | $-8.00712 * 10^{-8}$ | $3.38222 * 10^{-8}$ | 0.00000 | 0.00000 | 0.00000 | 0.00000 | 0.00000 |
| 10 | $1.54079 * 10^{-9}$ | 0.00000 | 0.00000 | 0.00000 | 0.00000 | 0.00000 | 0.00000 |

TABLE 8

Example 2 . . . configuration data $a_{ij}$ of the third surface (S3)

| | j | | | | | | |
|---|---|---|---|---|---|---|---|
| i | 0 | 1 | 2 | 3 | 4 | 5 | 6 |
| 0 | 0.00000 | 0.00000 | $-1.51186 * 10^{-2}$ | $1.53456 * 10^{-4}$ | $-8.43217 * 10^{-6}$ | $1.27153 * 10^{-7}$ | $-7.00577 * 10^{-10}$ |
| 2 | $-1.57061 * 10^{-2}$ | $3.07590 * 10^{-4}$ | $-2.83914 * 10^{-6}$ | $3.67962 * 10^{-7}$ | $-5.73957 * 10^{-8}$ | 0.00000 | 0.00000 |
| 4 | $1.63537 * 10^{-5}$ | $1.15762 * 10^{-6}$ | $-5.24957 * 10^{-7}$ | $-1.00004 * 10^{-7}$ | 0.00000 | 0.00000 | 0.00000 |
| 6 | $-1.03208 * 10^{-6}$ | $-4.47100 * 10^{-8}$ | $5.50944 * 10^{-8}$ | 0.00000 | 0.00000 | 0.00000 | 0.00000 |
| 8 | $5.19566 * 10^{-8}$ | $-5.45437 * 10^{-9}$ | 0.00000 | 0.00000 | 0.00000 | 0.00000 | 0.00000 |
| 10 | $-2.86103 * 10^{-10}$ | 0.00000 | 0.00000 | 0.00000 | 0.00000 | 0.00000 | 0.00000 |

TABLE 9

Example 3 . . . coordinate data of the optical surfaces

| | | origins of local coordinate systems | | | x vector of local coordinate systems | | | y vector of local coordinate systems | |
|---|---|---|---|---|---|---|---|---|---|
| Surface | | X | Y | Z | X | Y | Z | X | Y, Z |
| S1 | axisymmetric diffracting surface | 0.00 | 53.81 | −4.00 | 0.0000 | −1.0000 | 0.0000 | 1.0000 | 0.0000 |
| S2 | free-formed | 0.00 | 50.69 | 0.00 | 0.0000 | −0.6428 | 0.7660 | 1.0000 | 0.0000 |
| S3 | free-formed | 0.00 | 49.81 | −5.00 | 0.0000 | 0.6428 | −0.7660 | 1.0000 | 0.0000 |
| S4 | diffracting surface | 0.00 | 44.81 | −5.00 | 0.0000 | −1.0000 | 0.0000 | 1.0000 | 0.0000 |

TABLE 10

Example 3 . . . configuration data $a_i$ of the first surface (S1)

| i | 0 | 1 |
|---|---|---|
|   | 1.18993 | $-2.97483 * 10^{-1}$ |

TABLE 11

Example 3 . . . configuration data $a_{ij}$ of the second surface (S2)

| | | | | j | | | |
|---|---|---|---|---|---|---|---|
| i | 0 | 1 | 2 | 3 | 4 | 5 | 6 |
| 0 | 0.00000 | 0.00000 | $1.99020 * 10^{-2}$ | $-3.92558 * 10^{-4}$ | $1.80850 * 10^{-4}$ | $-1.190256 * 10^{-5}$ | $-2.40408 * 10^{-6}$ |
| 2 | $7.41897 * 10^{-3}$ | $6.80752 * 10^{-3}$ | $-2.71699 * 10^{-4}$ | $6.30746 * 10^{-5}$ | $-1.11421 * 10^{-5}$ | 0.00000 | 0.00000 |
| 4 | $2.58916 * 10^{-4}$ | $-4.49741 * 10^{-5}$ | $2.57710 * 10^{-5}$ | $-3.10481 * 10^{-6}$ | 0.00000 | 0.00000 | 0.00000 |
| 6 | $3.52931 * 10^{-6}$ | $1.77167 * 10^{-6}$ | $-1.80463 * 10^{-6}$ | 0.00000 | 0.00000 | 0.00000 | 0.00000 |
| 8 | $-3.27275 * 10^{-7}$ | $-1.50344 * 10^{-7}$ | 0.00000 | 0.00000 | 0.00000 | 0.00000 | 0.00000 |
| 10 | $-4.69916 * 10^{-9}$ | 0.00000 | 0.00000 | 0.00000 | 0.00000 | 0.00000 | 0.00000 |

TABLE 12

Example 3 . . . configuration data $a_{ij}$ of the third surface (S3)

| | | | | j | | | |
|---|---|---|---|---|---|---|---|
| i | 0 | 1 | 2 | 3 | 4 | 5 | 6 |
| 0 | 0.00000 | 0.00000 | $-1.51542 * 10^{-2}$ | $1.41647 * 10^{-4}$ | $-1.85750 * 10^{-5}$ | $4.65418 * 10^{-7}$ | $2.27003 * 10^{-7}$ |
| 2 | $-1.99559 * 10^{-2}$ | $1.89728 * 10^{-3}$ | $-2.45037 * 10^{-5}$ | $2.77256 * 10^{-7}$ | $-2.09185 * 10^{-7}$ | 0.00000 | 0.00000 |
| 4 | $1.51702 * 10^{-5}$ | $1.16567 * 10^{-5}$ | $-9.02800 * 10^{-7}$ | $1.38173 * 10^{-8}$ | 0.00000 | 0.00000 | 0.00000 |
| 6 | $-1.72045 * 10^{-6}$ | $-1.97829 * 10^{-7}$ | $8.96208 * 10^{-8}$ | 0.00000 | 0.00000 | 0.00000 | 0.00000 |
| 8 | $6.73980 * 10^{-8}$ | $4.44134 * 10^{-9}$ | 0.00000 | 0.00000 | 0.00000 | 0.00000 | 0.00000 |
| 10 | $-5.17474 * 10^{-10}$ | 0.00000 | 0.00000 | 0.00000 | 0.00000 | 0.00000 | 0.00000 |

TABLE 13

Example 3 . . . configuration data $a_{ij}$ of the fourth surface (S4)

| | j |
|---|---|
| i | 1 |
| 0 | $-1.62128 * 10^{-1}$ |

TABLE 14

Example 3 . . . coefficient $b_i$ of phase functions p of the first surface (S1)

| i | 0 | 1 |
|---|---|---|
|   | 1.18993 | $-2.97483 * 10^{-1}$ |

TABLE 15

Example 3 . . . coefficient $b_{ij}$ of phase functions p of the fourth surface (S4)

| | j | |
|---|---|---|
| i | 1 | 2 |
| 0 | $1.09000 * 10^2$ | $-5.00000$ |

TABLE 16

Example 4 . . . coordinate data of the optical surfaces

| Surface | origins of local coordinate systems | | | x vector of local coordinate systems | | | y vector of local coordinate systems | |
|---|---|---|---|---|---|---|---|---|
| | X | Y | Z | X | Y | Z | X | Y, Z |
| S1 free-formed | 0.00 | 30.00 | −4.00 | 0.0000 | 0.0000 | 1.0000 | 1.0000 | 0.0000 |
| S2 free-formed | 0.00 | 30.00 | 0.00 | 0.0000 | 0.7071 | 0.7071 | 1.0000 | 0.0000 |
| S3 axisymmetric diffracting surface | 0.00 | 25.00 | 0.00 | 0.0000 | −1.0000 | 0.0000 | 1.0000 | 0.0000 |

TABLE 17

Example 4 . . . configuration data $a_{ij}$ of the first surface (S1)

| | j | | |
|---|---|---|---|
| i | 0 | 1 | 2 |
| 0 | 0.00000 | 0.00000 | $6.98477 * 10^{-3}$ |
| 2 | $-3.52755 * 10^{-3}$ | $-6.48250 * 10^{-3}$ | 0.00000 |

TABLE 18

Example 4 . . . configuration data $a_{ij}$ of the second surface (S2)

| | j | | | | | | |
|---|---|---|---|---|---|---|---|
| i | 0 | 1 | 2 | 3 | 4 | 5 | 6 |
| 0 | 0.00000 | 0.00000 | $-8.21053 * 10^{-3}$ | $-4.83841 * 10^{-5}$ | $1.77165 * 10^{-6}$ | $3.10338 * 10^{-8}$ | $-4.35176 * 10^{-8}$ |
| 2 | $-1.44870 * 10^{-2}$ | $-1.16735 * 10^{-3}$ | $-6.83222 * 10^{-5}$ | $-5.86029 * 10^{-6}$ | $-3.28807 * 10^{-7}$ | 0.00000 | 0.00000 |
| 4 | $1.63693 * 10^{-5}$ | $3.86115 * 10^{-6}$ | $7.36155 * 10^{-7}$ | $8.97919 * 10^{-8}$ | 0.00000 | 0.00000 | 0.00000 |
| 6 | $-6.98102 * 10^{-8}$ | $-5.42497 * 10^{-8}$ | $-3.24219 * 10^{-9}$ | 0.00000 | 0.00000 | 0.00000 | 0.00000 |
| 8 | $-3.63095 * 10^{-10}$ | $9.69579 * 10^{-10}$ | 0.00000 | 0.00000 | 0.00000 | 0.00000 | 0.00000 |
| 10 | $4.14544 * 10^{-11}$ | 0.00000 | 0.00000 | 0.00000 | 0.00000 | 0.00000 | 0.00000 |

TABLE 19

Example 4 . . . coefficient $b_i$ of phase functions p of the third surface (S3)

| i | 2 |
|---|---|
| | $-1.00000 * 10$ |

What is claimed is:

1. A light scanning apparatus comprising:
a light source emitting a light beam;
a deflector for deflecting an incident light beam in a main scanning direction;
a light source optical system comprising an optical element made of resin, the optical element having at least one reflecting surface with no symmetry axis of rotation and having two transmitting surfaces, said light source optical system shaping the light beam emitted from the light source into a substantially parallel beam in the main scanning direction, and condensing the light beam emitted from the light source in a vicinity of a deflecting surface of the deflector in a sub scanning direction; and
a scanning optical system condensing the light beam deflected by the deflector.

2. The light scanning apparatus as claimed in claim 1 wherein the light is totally reflected on the reflecting surface.

3. The light scanning apparatus as claimed in claim 1, wherein the optical element has two reflecting surfaces.

4. The light scanning apparatus as claimed in claim 1, wherein at least one surface of the transmitting surfaces is a diffracting surface.

5. The light scanning apparatus as claimed in claim 4, wherein a refracting power is canceled out by a diffracting power at the diffracting surface.

6. The light scanning apparatus as claimed in claim 4, wherein a principal ray incident on the diffracting surface passes in a straight line.

7. The light scanning apparatus as claimed in claim 1, wherein both of the two transmitting surfaces are diffracting surfaces and diffraction angles of the two diffracting surfaces change opposite to each other with a change in wavelength.

8. A laser scanner comprising:
a laser light source emitting a laser beam;
a deflector deflecting an incident laser beam in a main scanning direction;
a light source optical system comprising an optical element made of resin, the optical element having
a first transmitting surface on which the laser beam emitted from the laser light source is incident,
at least one reflecting surface reflecting the laser beam incident on the first transmitting surface, the at least one reflecting surface having no symmetry axis of rotation, and
a second transmitting surface from which the laser beam reflected by the reflecting surface exits,
said light source optical system shaping the laser beam emitted from the laser light source into a substantially parallel beam in the main scanning direction, and condensing the laser beam emitted by the laser light source in a vicinity of a deflecting surface of the deflector in a sub scanning direction; and a scanning optical system again condensing the laser beam deflected by the deflector.

9. The laser scanner as claimed in claim 8, wherein the laser light is totally reflected on the reflecting surface.

10. The laser scanner as claimed in claim 8, wherein the optical element has two reflecting surfaces.

11. The laser scanner as claimed in claim 8, wherein at least one surface of the transmitting surfaces is a diffracting surface.

12. The laser scanner as claimed in claim 11, wherein a refracting power is canceled out by a diffracting power at the diffracting surface.

13. The laser scanner as claimed in claim 11, wherein a principal ray incident on the diffracting surface passes in a straight line.

14. The laser scanner as claimed in claim 8, wherein both of the two transmitting surfaces are diffracting surfaces and diffraction angles of the two diffracting surfaces change opposite to each other with a change in wavelength.

15. A laser scanner scanning a laser light on a photosensitive member of an image forming apparatus, said laser scanner comprising:

a laser light source emitting a laser beam;

a deflector deflecting an incident laser beam in a main scanning direction;

a light source optical system shaping the laser beam emitted from the laser light source into a substantially parallel beam in the main scanning direction, and condensing the laser beam emitted by the laser light source in a vicinity of a deflecting surface of the deflector in a sub scanning direction; and a scanning optical system condensing the laser beam deflected by the deflector, wherein said light source optical system comprises an optical element made of resin, the optical element having a first transmitting surface on which the laser beam emitted from the laser light source is incident, at least one reflecting surface reflecting the laser beam incident on the first transmitting surface, the at least one reflecting surface having no symmetry axis of rotation, and a second transmitting surface from which the laser beam reflected by the reflecting surface exits.

16. The laser scanner as claimed in claim 15, wherein the laser light is totally reflected on the reflecting surface.

17. The laser scanner as claimed in claim 15, wherein at least one surface of the transmitting surfaces is a diffracting surface.

18. The laser scanner as claimed in claim 15, wherein both of the two transmitting surfaces are diffracting surfaces and diffraction angles of the two diffracting surfaces change opposite to each other with a change in wavelength.

* * * * *